United States Patent
Wada et al.

(10) Patent No.: US 11,421,946 B2
(45) Date of Patent: Aug. 23, 2022

(54) HEAT EXCHANGER AND WATER HEATING APPARATUS INCLUDING THE SAME

(71) Applicant: NORITZ CORPORATION, Hyogo (JP)

(72) Inventors: Norihide Wada, Hyogo (JP); Masahiro Iguchi, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 88 days.

(21) Appl. No.: 17/072,043

(22) Filed: Oct. 16, 2020

(65) Prior Publication Data
US 2021/0156629 A1 May 27, 2021

(30) Foreign Application Priority Data
Nov. 26, 2019 (JP) ............................ JP2019-213264

(51) Int. Cl.
*F28F 9/02* (2006.01)
*F24H 1/10* (2022.01)
*F28F 1/30* (2006.01)

(52) U.S. Cl.
CPC .............. *F28F 9/02* (2013.01); *F24H 1/107* (2013.01); *F28F 1/30* (2013.01); *F28F 2009/0297* (2013.01)

(58) Field of Classification Search
CPC ....... F28F 1/30; F28F 2009/0297; F24H 1/14; F24H 9/148
See application file for complete search history.

(56) References Cited

U.S. PATENT DOCUMENTS

| | | | |
|---|---|---|---|
| 2008/0061160 A1* | 3/2008 | Ootomo | F24H 9/14 237/8 R |
| 2016/0273850 A1* | 9/2016 | Okamoto | F28F 1/32 |
| 2016/0377348 A1* | 12/2016 | Fujisawa | F28F 9/001 165/175 |
| 2018/0231333 A1* | 8/2018 | Miura | F28F 1/02 |

FOREIGN PATENT DOCUMENTS

| | | | | |
|---|---|---|---|---|
| CN | 205049014 | | 2/2016 | |
| CN | 206207745 U | * | 5/2017 | |
| JP | 4841567 | | 12/2011 | |
| JP | 2017116203 A | * | 6/2017 | ............ F23D 14/78 |
| JP | 2017133716 A | * | 8/2017 | |
| JP | 6558570 | | 8/2019 | |

* cited by examiner

*Primary Examiner* — Devon Russell
(74) *Attorney, Agent, or Firm* — JCIPRNET (57) ABSTRACT

A heat exchanger includes a case into which heating gas is supplied, a heat transfer pipe accommodated in the case, and first and second header sections, each of which has a chamber formed using a protruding part provided in the sidewall section, and to which the heat transfer pipe is connected such that a fluid to be heated enters and exit the chamber. The sidewall section has a configuration in which an inner plate and an outer plate overlap each other, the protruding part of the first header section is provided on the inner plate and protrudes toward an inside of the case, and the protruding part of the second header section is provided on the outer plate and protrudes toward an outside of the case.

3 Claims, 7 Drawing Sheets

HEAT EXCHANGER AND WATER HEATING APPARATUS INCLUDING THE SAME

CROSS-REFERENCE TO RELATED APPLICATION

This application claims the priority of Japan patent application serial no. 2019-213264, filed on Nov. 26, 2019. The entirety of the above-mentioned patent application is hereby incorporated by reference herein and made a part of this specification.

BACKGROUND

Technical Field

The disclosure relates to a heat exchanger configured to perform heat recovery from a heating gas such as a combustion gas or the like using a heat transfer pipe, and a water heating apparatus such as a water heater or the like including the same.

Description of Related Art

Specific examples of a heat exchanger that constitutes a water heating apparatus are disclosed in Patent Documents 1 to 3.

The heat exchanger disclosed in Patent Documents 1 and 2 includes a case into which a combustion gas serving as heating gas is supplied, and a plurality of heat transfer pipes accommodated in the case and through which water flows as a fluid to be heated. A plurality of header sections having chambers that enable water to flow in or be tapped such that water may enter or leave the plurality of heat transfer pipes are provided on a sidewall section of the case. This is provided that the plurality of header sections are formed by providing protruding parts that protrude toward either an outside or an inside of the case.

According to the above-mentioned configuration, since the header sections are formed using a part of the sidewall section of the case, the configuration of the header sections can be simplified, and manufacturing costs can be reduced.

Meanwhile, in the heat exchanger disclosed in Patent Document 3, a plurality of header sections is provided on a sidewall section of a case. In order to realize this structure, the sidewall section of the case has a dual structure in which an inner plate and an outer plate overlap each other. The inner plate is formed in a flat plate shape that supports a heat transfer pipe, a plurality of protruding parts that protrude toward an outside of the case is provided on the outer plate, and regions between the plurality of protruding parts and the inner plate form a plurality of chambers.

However, in the related art, as described below, there is still room for improvement.

That is, in all of Patent Documents 1 to 3, the plurality of header sections provided on one sidewall section of the case has the protruding parts that protrude toward only the outside of the case, or protrude toward only the inside of the case. For this reason, when the plurality of protruding parts are provided such that they are close to each other, it is difficult to appropriately form these protruding parts, and productivity with respect to the heat exchanger may be hampered. In addition, in some cases, the design specification of the heat exchanger may need to be changed such that the plurality of header sections are not close each other.

In order to provide the protruding parts on the sidewall section of the case, in general, an apparatus for pressing the sidewall section is employed. However, in the above-mentioned structure, it may be difficult to suitably form the protruding parts that protrude in the same direction with an arrangement in which they are close to each other, and the above-mentioned disadvantages become more significant.

Patent Documents

[Patent Document 1] Japanese Patent No. 4841567
[Patent Document 2] Japanese Patent No. 6558570
[Patent Document 3] Chinese Utility Model No. CN205049014U

SUMMARY

One of the embodiments of the disclosure provides a heat exchanger including a case having at least one sidewall section and into which heating gas is supplied; a heat transfer pipe accommodated in the case and through which a fluid to be heated flows; and first and second header sections, each of which has a protruding part provided in the sidewall section and a chamber formed using the protruding part, and the heat transfer pipe is connected to the chamber such that the fluid to be heated enters and exit the chamber, wherein the sidewall section has a configuration in which an inner plate and an outer plate overlap each other, the protruding part of the first header section is provided on the inner plate and protrudes toward an inside of the case, and the protruding part of the second header section is provided on the outer plate and protrudes toward an outside of the case.

One of the embodiments of the disclosure provides a water heating apparatus including the heat exchanger provided according to the first aspect of the disclosure.

Other features and advantages of the disclosure will become more apparent from the description of the disclosure given below with reference to the accompanying drawings.

DESCRIPTION OF THE EMBODIMENTS

The disclosure provides a heat exchanger capable of appropriately preventing or minimizing the above-mentioned disadvantages, and a water heating apparatus including the heat exchanger.

In order to solve the problems, in the disclosure, the following technical measures are provided.

In one of the embodiments, the heat transfer pipe includes a fin-attached heat transfer pipe attached with a plurality of fins, and the plurality of fins are arranged and joined in an axis direction of the heat transfer pipe, wherein a gap is formed between a fin of an outermost end portion, among the plurality of fins, and the sidewall section of the case, and the protruding part of the first header section closes a lower opening section or an upper opening section of the gap.

In one of the embodiments, a portion of the outer plate facing the protruding part of the first header section is a first auxiliary protruding part that protrudes toward the outside of the case, and the chamber of the first header section is formed using the first auxiliary protruding part.

In one of the embodiments, the first auxiliary protruding part is disposed farther from the second header section than the protruding part of the first header section.

In one of the embodiments, a portion of the inner plate facing the protruding part of the second header section is a second auxiliary protruding part that protrudes toward the inside of the case, and the chamber of the second header section is formed using the second auxiliary protruding part.

In one of the embodiments, the second auxiliary protruding part is disposed farther from the first header section than the protruding part of the second header section.

Hereinafter, a preferred embodiment of the disclosure will be described in detail with reference to the accompanying drawings.

Figure 3:
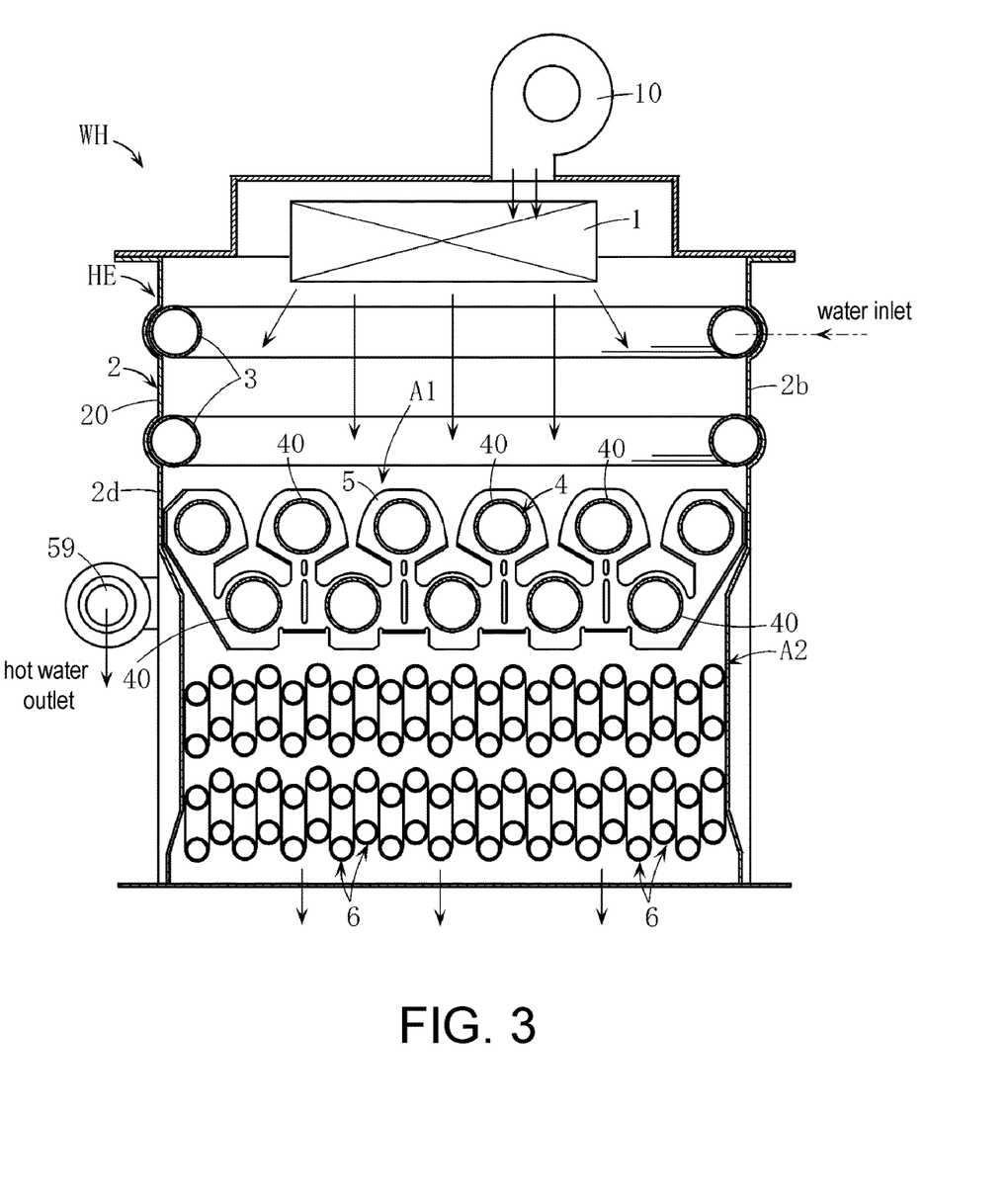
FIG. 3 is a front cross-sectional view showing an example of a water heating apparatus configured using the heat exchanger of FIG. 1.

A water heating apparatus WH shown in FIG. 3 includes a burner 1 configured to generate combustion gas serving as heating gas, and a heat exchanger HE. The heat exchanger HE includes a case 2, a plurality of body pipes 3 disposed in the case 2, a primary heat exchange part A1 having a plurality of fins 5 and a heat transfer pipe 4, a secondary heat exchange part A2 having a plurality of heat transfer pipes 6, and a plurality of header sections Ha to Hd shown in FIG. 1.

The burner 1 is a reverse combustion type known in the related art. In the burner 1, fuel gas is mixed with combustion air supplied using a fan 10 and ignited, and the combustion gas generated in this way is supplied downward from an upper side in the case 2.

The body pipes 3 are bent in substantially a H shape, and the plurality of body pipes 3 are provided along upper inner surfaces of sidewall sections 2b to 2d of the case 2 (see also FIG. 1 and FIG. 2), and as described below, water is supplied to flow therethrough. As a result, the body pipes 3 play a role of cooling the plurality of sidewall sections 2b to 2d of the case 2, and in addition, also absorb heat from combustion gas for water. Cooling of a sidewall section 2a of the case 2 is performed by the plurality of header sections Ha to Hd, which will be described below.

The primary heat exchange part A1 and the secondary heat exchange part A2 are areas configured to recover sensible heat and latent heat from combustion gas and heat water.

Figure 4:
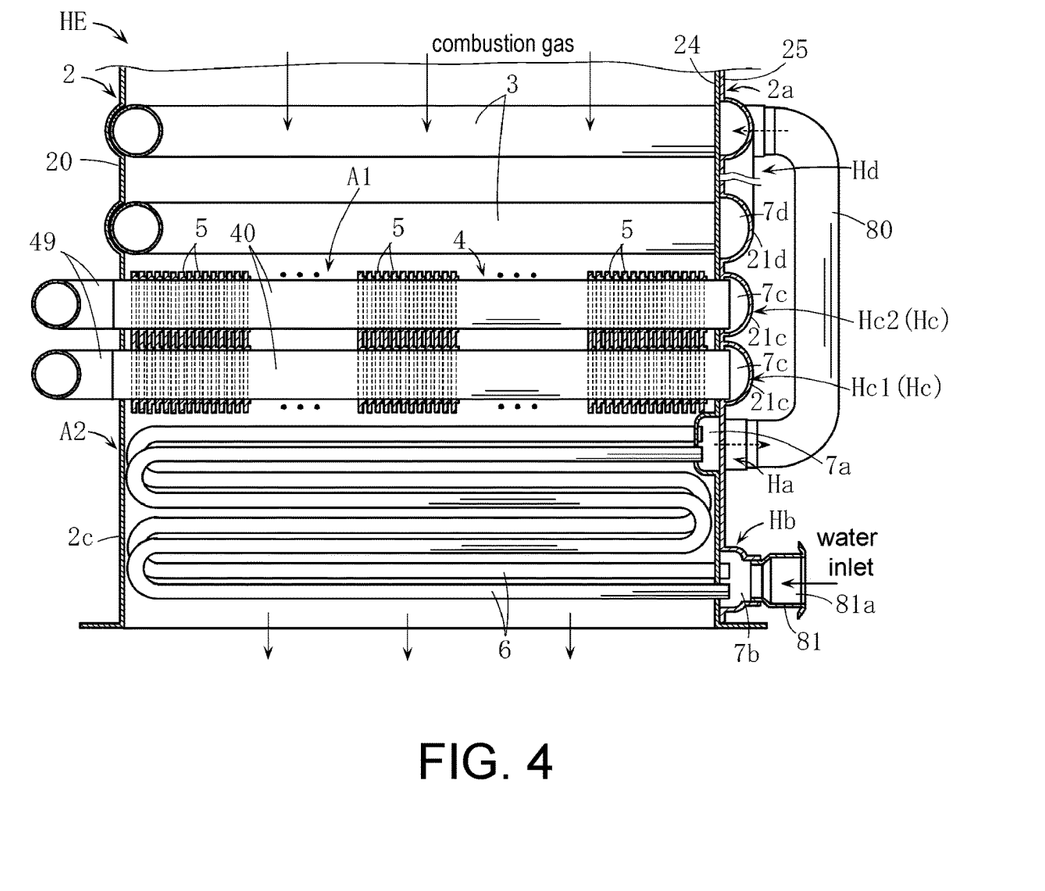
FIG. 4 is a side cross-sectional view of a major part of FIG. 3.

The primary heat exchange part A1 is provided at a position below the body pipes 3. The heat transfer pipe 4 of the primary heat exchange part A1 has a configuration in which a plurality of linear pipe body sections 40 lying transversely side by side in the case 2 in vertical and horizontal direction in series via bent pipes 49 and the plurality of header sections He (to be described below) provided on the sidewall section 2a of the case 2 (see FIG. 4). The plurality of fins 5, each of which is formed in a plate shape, are penetrated by and bonded to the plurality of pipe body sections 40, and arranged in an axis direction of each of the pipe body sections 40.

The secondary heat exchange part A2 has a configuration in which the plurality of heat transfer pipes 6 is disposed below the heat exchanger HE in the case 2. Each of the heat transfer pipes 6 is, for example a serpentine heat transfer pipe, and heights of the plurality of heat transfer pipes 6 are different from each other when seen in a front cross-sectional view such that heights of neighboring heat transfer pipes 6 are different from each other.

Figure 1:
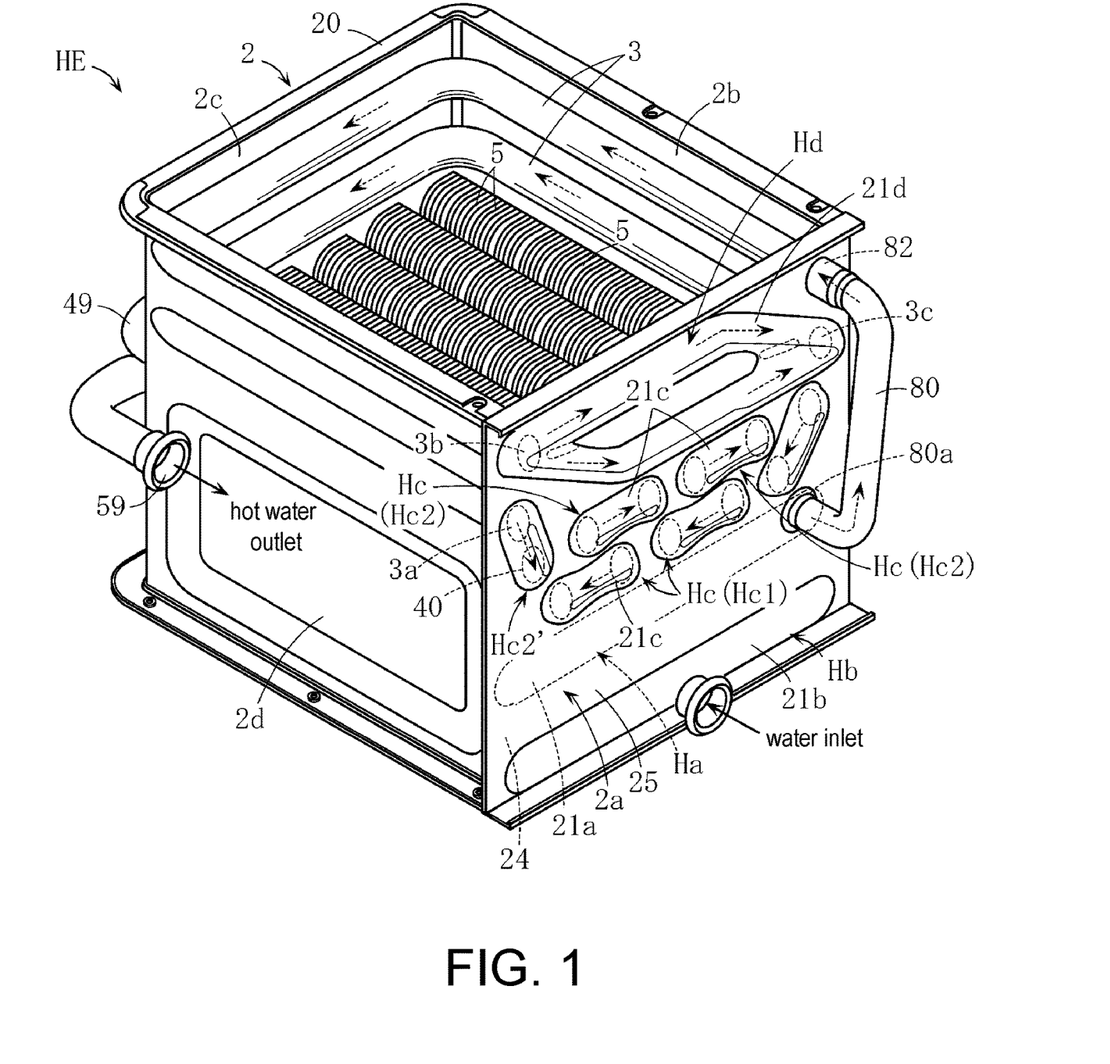
FIG. 1 is a perspective view showing an example of a heat exchanger according to the disclosure.

As shown in FIG. 1, the case 2 has a substantially rectangular tubular shape, both of upper and lower surface section of which are open. The case 2 includes a case main body section 20 having the sidewall sections 2b to 2d and formed in substantially a H when seen in a plan view, and an inner plate 24 and an outer plate 25 that constitute the sidewall section 2a.

Figure 2:
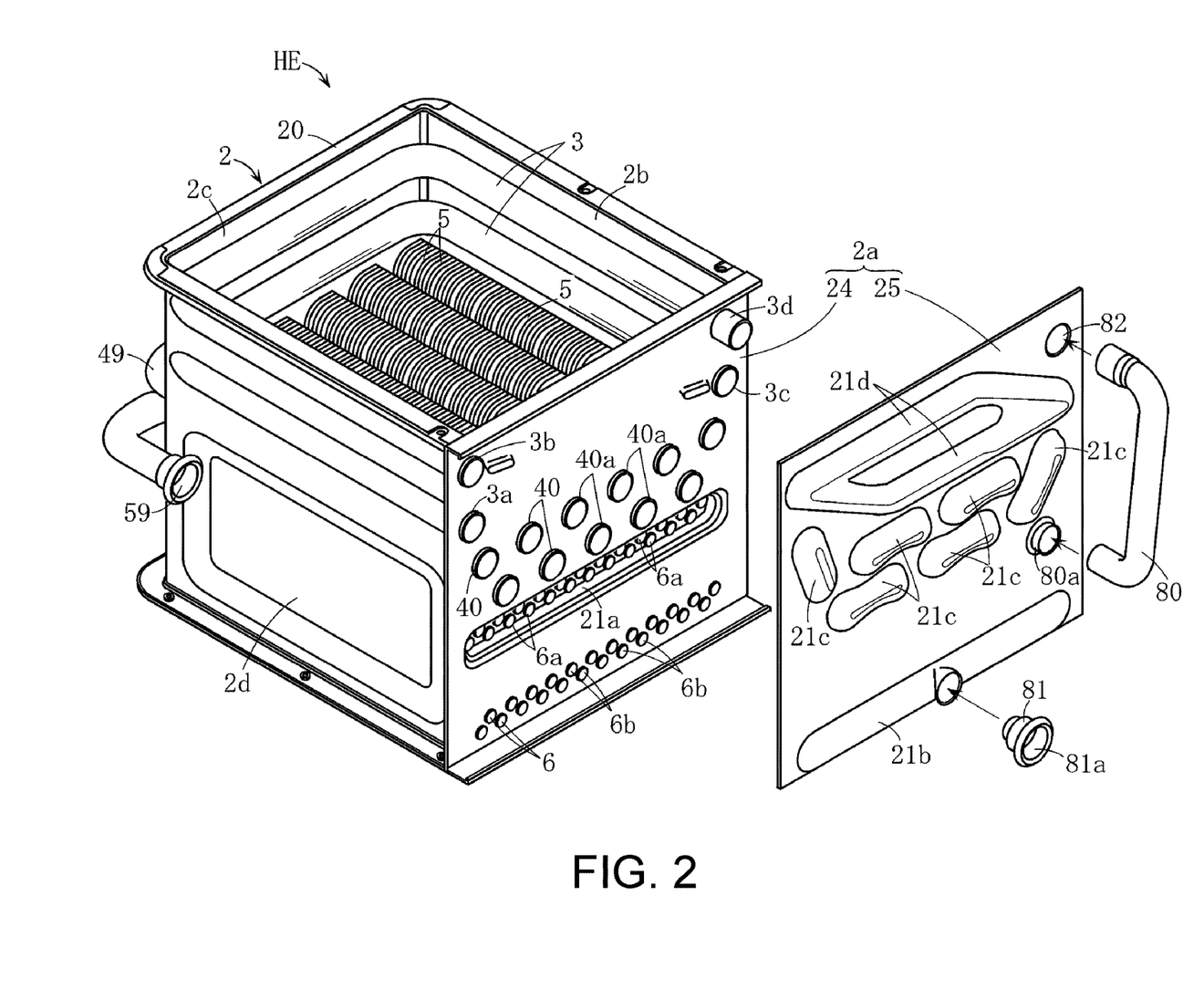
FIG. 2 is an exploded perspective view of FIG. 1.

As shown in FIG. 2, the inner plate 24 is joined to the case main body section 20 to cover an opening section of one side surface of the case main body section 20. End portions 3a to 3d of the body pipes 3, one end portions 40a of the plurality of pipe body sections 40 that constitute the heat transfer pipe 4, and both end portions 6a and 6b of the plurality of heat transfer pipes 6 pass through the inner plate 24 and are connected to each other.

A region of the inner plate 24 through which upper end portions 6a of the plurality of heat transfer pipes 6 pass to be connected to each other is formed as a protruding part 21a that protrudes toward an inside of the case 2. The protruding part 21a is a component of the header section Ha (first header section), which will be described below.

The outer plate 25 is a member that configures the plurality of header sections Ha to Hd by overlapped and joined on an outer surface side of the inner plate 24. The outer plate 25 includes a plurality of protruding parts 21b to 21d that protrudes toward an outside of the case 2 as protruding parts that constitute the plurality of header sections Hb to Hd shown in FIG. 1.

The plurality of header sections Ha to Hd will be described below in detail.

The header section Ha is a header section for tapping of the secondary heat exchange part A2, and corresponds to a specific example of the first header section in the disclosure. The other header sections Hb to Hd correspond to a specific example of the second header section of the disclosure. However, in the embodiment, the header section He (Hc1) is exemplified as the second header section having correspondence in which advantages intended in the disclosure with respect to the header section Ha can be most effectively generated.

Figure 5:
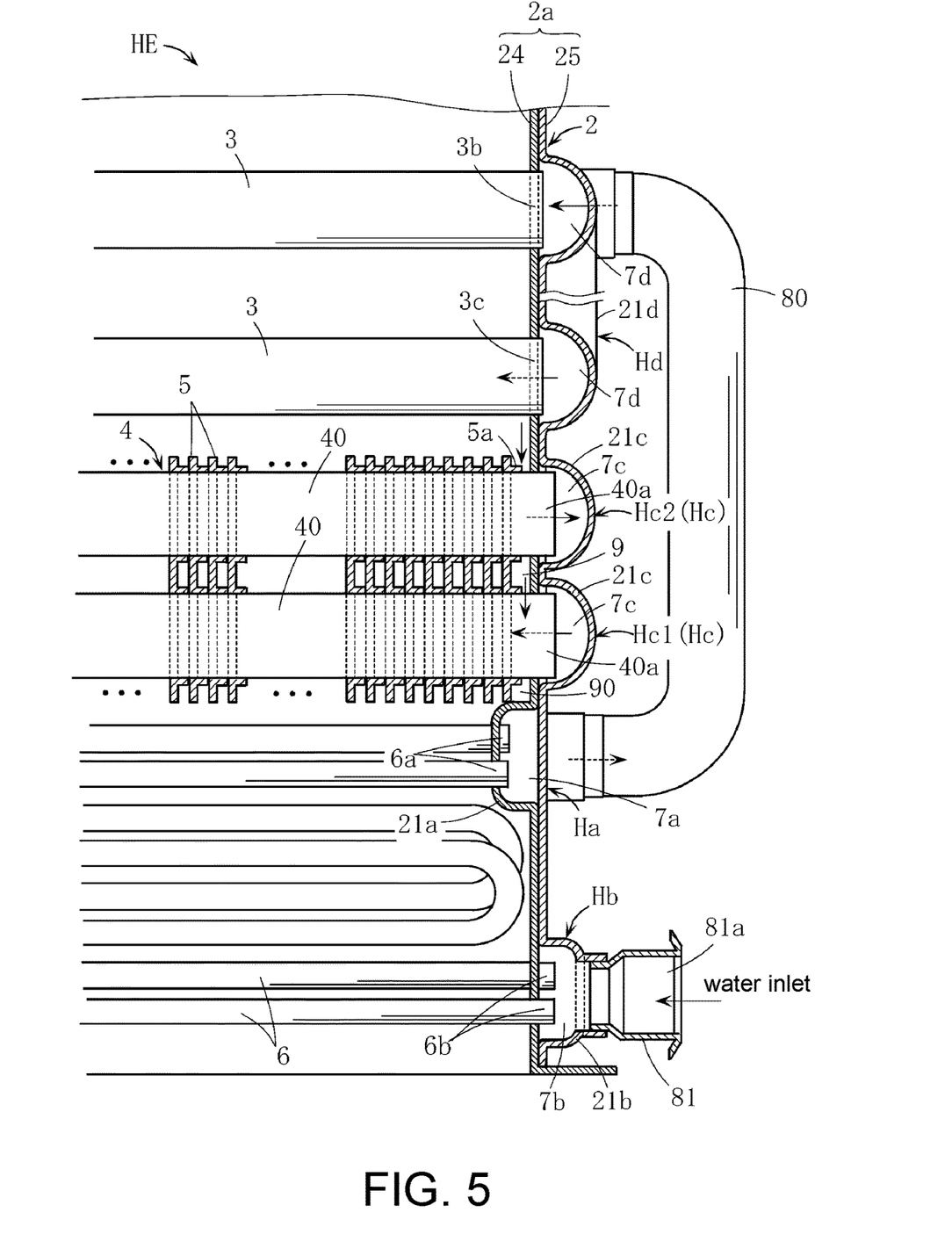
FIG. 5 is an enlarged cross-sectional view of a major part of FIG. 4.

The header section Ha is formed as a part of the outer plate 25 which overlaps an outer side of the protruding part 21a of the inner plate 24. As shown in FIG. 5, a chamber 7a communicating with the upper end portions 6a of the plurality of heat transfer pipes 6 is formed inside the header section Ha. A connecting port 80a (a tapping port of the secondary heat exchange part A2) for a lower end of a connecting pipe body 80 is provided in a portion of the outer plate 25 corresponding to the header section Ha.

Further, the header section Ha is designed to close a lower opening section 90 of a gap 9 formed between the fin 5a of an outermost end portion among the plurality of fins 5 and the sidewall section 2a. A length of the header section Ha in a widthwise direction is substantially the same as a length of the fins 5 in a widthwise direction. In FIG. 5, while the fin 5a of the outermost end portion comes in contact with the header section Ha and the lower opening section 90 is shown in a completely closed state, there may be a gap having a very small size between them.

The header section Hb is a header section allowing inflow of water to the secondary heat exchange part A2. The header section Hb is formed at a portion of the outer plate 25 corresponding to lower end portions 6b of the plurality of heat transfer pipes 6, and configured to include the protruding part 21b that protrudes toward the outside of the case 2.

A chamber 7b communicating with the lower end portions 6b of the heat transfer pipes 6 is formed inside the protruding part 21b. A coupling member 81 is attached to the header section Hb, and a water inflowing port 81a is provided in the header section Hb.

The header section He (Hc1, Hc2) is a header section configured to play a role as a communication path configured to allow the plurality of pipe body sections 40 of the heat transfer pipe 4 to communicate with each other. The header section He is formed at a portion of the outer plate 25 corresponding to the one end portions 40a of the plurality of pipe body sections 40 of the heat transfer pipe 4, and configured to include the protruding part 21e that protrudes toward the outside of the case 2. A chamber 7c communicating with the one end portions 40a of the pipe body sections 40 is formed inside the protruding part 21c. However, a header section Hc2' brings the one end portion 3a of the body pipe 3 of a lower stage in communication with the pipe body sections 40.

The header section Hd is a header section configured to play a role as a communication path configured to bring the one end portion 3b of the body pipe 3 of an upper stage in communication with the other end portion 3c of the body pipe 3 of the lower stage. The header section Hd is formed at a portion of the outer plate 25 corresponding to a region that reaches the other end portion 3c from the one end portion 3b, and configured to include the protruding part 21d that protrudes toward the outside of the case 2. If the protruding part 21d branches into a bifurcated shape at a midway point, this increases an area of the header section Hd and helps to increase a cooling effect of the sidewall section 2a on the header section Hd.

An opening section 82 configured to connect an upper end of the connecting pipe body 80 to the one end portion 3d is formed in the outer plate 25. The opening section 82 corresponds to a water inflowing port with respect to the body pipes 3.

In the heat exchanger HE, water such as tap water or the like is supplied to the water inflowing port 81a. After that, the water moves as shown by an arrow in FIG. 1. That is, the water supplied to the water inflowing port 81a flows into the header section Hb and flows through the plurality of heat transfer pipes 6, and then, arrives at the header section Ha. After that, the water flows through the connecting pipe body 80 to flow into the body pipes 3, and flows to the heat transfer pipe 4 after passing through the body pipes 3. Here, the water flows through the plurality of header sections He or the bent pipes 49, in addition to the pipe body sections 40, arrives at a tapping port 59 of the heat transfer pipe 4 finally, and then, is tapped. In the above-mentioned circulating process of water, water is heated by combustion gas, and hot water is generated.

Next, actions of the heat exchanger HE and the water heating apparatus WH including the same will be described.

As shown in FIG. 5, the header section Ha (the first header section) and the header section Hc1 (the second header section) have a positional relation in which they are close to each other in a vertical height direction. On the other hand, while the protruding part 21a of the header section Ha is provided on the inner plate 24 and protrudes toward the inside of the case 2, the protruding part 21c of the header section Hc1 is provided on the outer plate 25 and protrudes toward the outside of the case 2. Accordingly, in the header sections Ha and Hc1, the protruding parts 21a and 21c do not interfere with each other, and when one is formed, an influence thereof is not exerted to the other. Unlike in the present embodiment, when the two protruding parts 21a and 21c are provided on the same plate and protruding directions thereof are the same, it is difficult to appropriately form the two protruding parts 21a and 21c through pressing, but according to the present embodiment, such concerns can be appropriately eliminated. As a result, there is no need to change a design specification of the heat exchanger HE such that the two header sections Ha and Hc1 do not approach each other. Since the header sections Ha and Hc1 approach each other, reduction in size of the heat exchanger HE can also be achieved.

As described above, the header section Ha prevents combustion gas passing through the gap 9 because the lower opening section 90 of the gap 9 between the fin 5a of the outermost end portion and the sidewall section 2a is closed. When a large amount of combustion gas passes through the gap 9, a heat recovery amount due to the primary heat exchange part A1 is reduced. Incidentally, this can be appropriately prevented by the heat exchanger HE of the embodiment. Unlike the embodiment, for example, when a combustion type is a normal combustion type (a type in which combustion gas moves upward), a configuration in which an upper opening section of a gap corresponding to the gap 9 is closed by a protruding part of a header section may be provided.

In addition, in the embodiment, the pipe body sections 40 of the primary heat exchange part A1 and the body pipes 3 are in communication with each other using the header sections He and Hd. For this reason, compared with the case in which these areas communicate with each other via bent pipes, the operation of manufacturing the heat exchanger HE can be simplified. Since the header sections Ha to Hd have the protruding parts 21a to 21d, strengthening of the sidewall section 2a is also achieved.

Figure 6:
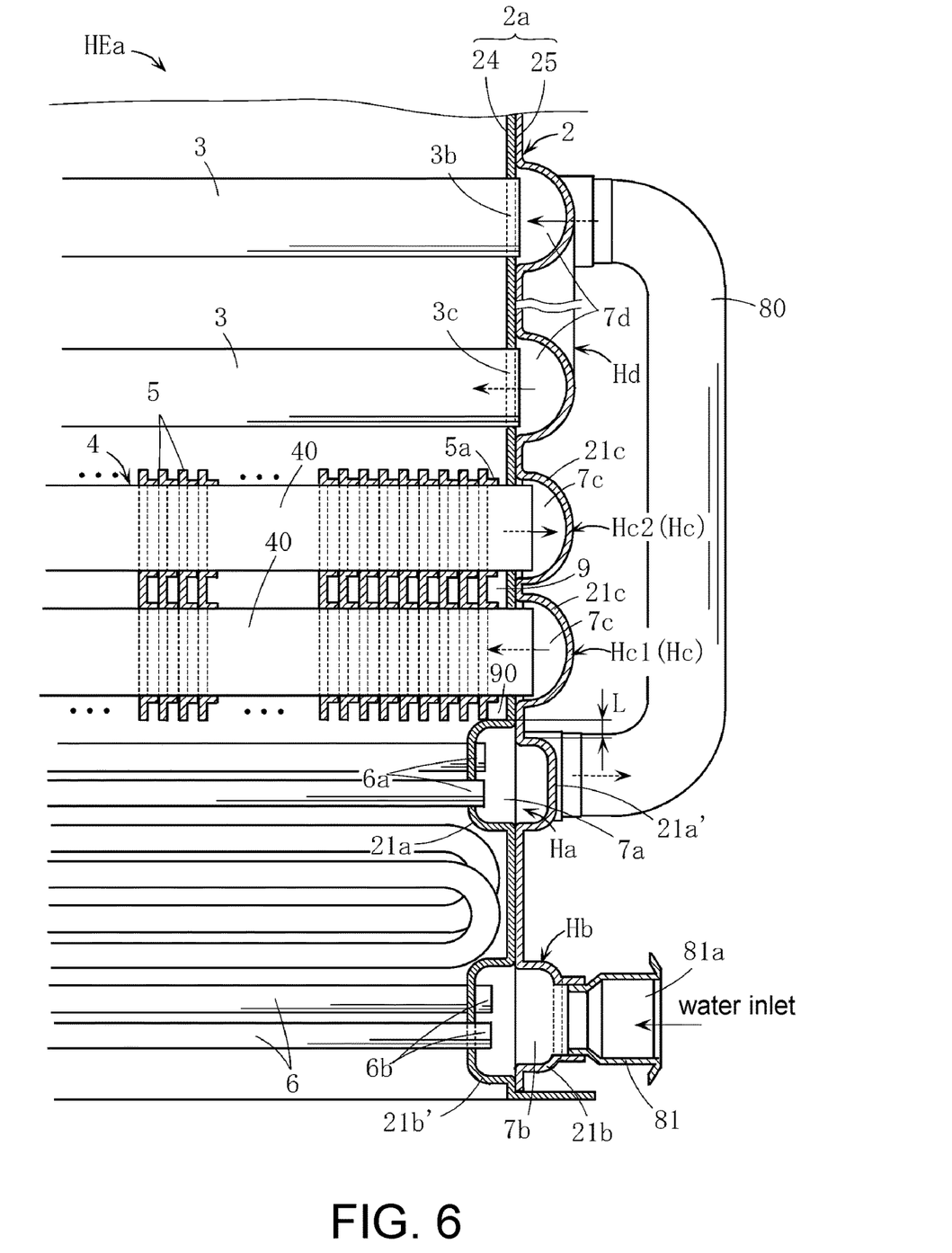
FIG. 6 is an enlarged cross-sectional view of a major part of another example of the disclosure.
Figure 7:
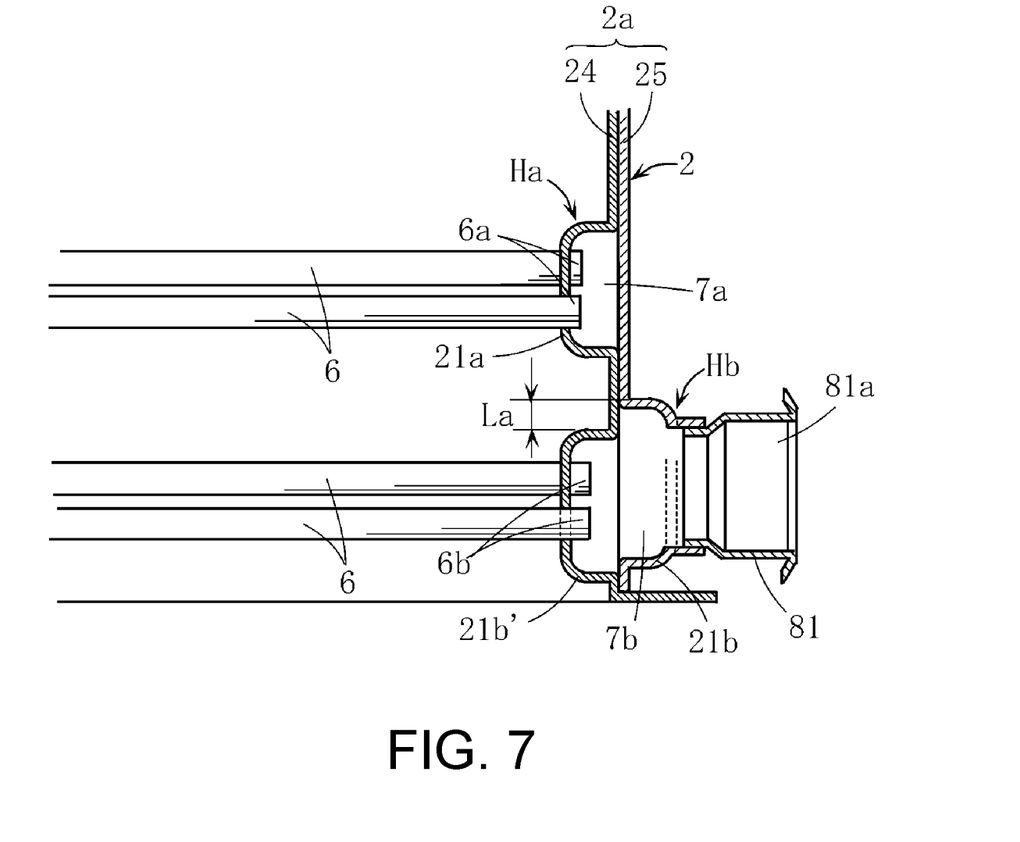
FIG. 7 is an enlarged cross-sectional view of a major part of another example of the disclosure.

FIG. 6 and FIG. 7 show another embodiment of the disclosure. In these drawings, elements the same as or similar to those of the embodiment are designated by the same reference signs as those in the embodiment, and repeated description thereof will be omitted.

In the heat exchanger HEa shown in FIG. 6, a portion of the outer plate 25 facing the protruding part 21a of the header section Ha is an auxiliary protruding part 21a' (a first auxiliary protruding part) that protrudes toward the outside of the case 2. As a result, the chamber 7a of the header section Ha is a space section sandwiched between both of the protruding part 21a and the auxiliary protruding part 21a'.

In addition, the auxiliary protruding part 21a' is disposed below the protruding part 21a by an appropriate dimension L, and disposed at a position farther from the protruding part 21c of the header section Hc1 than the protruding part 21a.

Meanwhile, a portion of the inner plate 24 facing the protruding part 21b of the header section Hb is an auxiliary protruding part 21b' (a second auxiliary protruding part) that protrudes toward the inside of the case 2. As a result, the chamber 7b of the header section Hb is a space section sandwiched between both of the protruding part 21b and the auxiliary protruding part 21b'. An upper section of the auxiliary protruding part 21b' approaches or abuts lower surface sections of the plurality of heat transfer pipes 6.

According to the embodiment, capacities of the chambers 7a and 7b of both of the header sections Ha and Hb are increased, and a resistance when water passes through the header sections Ha and Hb can be reduced. In addition, the strength of the sidewall section 2a of the case 2 is further increased due to the existence of the auxiliary protruding parts 21a' and 21b'.

Like the protruding part 21c of the header section Hc1, the auxiliary protruding part 21a' is formed on the outer plate 25, disposed below the protruding part 21a by the appropriate dimension L and displaced far from the protruding part 21c. For this reason, a long flat-plate-shaped portion may be formed between the auxiliary protruding part 21a' and the protruding part 21c. Accordingly, when the protruding parts 21c and 21a' are formed through pressing, the processing can be performed easily.

Meanwhile, since the auxiliary protruding part 21b' of the header section Hb approaches or abuts the lower surface sections of the plurality of heat transfer pipes 6, positioning of the plurality of heat transfer pipes 6 can also be appropriately performed with reference to the protruding part 21b'.

In the embodiment shown in FIG. 7, the auxiliary protruding part 21b' of the header section Hb (the second header section) is displaced below the protruding part 21b by an appropriate dimension La. Accordingly, the auxiliary protruding part 21b' is disposed far from the protruding part 21a of the header section Ha, and the protruding part 21a and the auxiliary protruding part 21b' can be appropriately formed.

The disclosure is not limited to the contents of the above-mentioned embodiment. Any of various changes to the design of specific configurations of the respective parts of the heat exchanger and the water heating apparatus according to the disclosure can be made without departing from the spirit of the disclosure.

In the above-mentioned embodiment, while three types of heat transfer pipes (the body pipes 3 are also included in the heat transfer pipe) of the body pipes 3, the heat transfer pipe 4 that constitutes the primary heat exchange part A1 and the heat transfer pipes 6 that constitute the secondary heat exchange part A2 are provided in the one case 2, the number or types of the heat transfer pipes are not limited thereto. A heat exchanger in which one type of heat transfer pipes are accommodated in one case may also be provided. Specific shapes, materials, sizes, numbers, or the like, of the heat transfer pipes are not limited.

As can be understood from the above-mentioned embodiment, the header section disclosed in the disclosure is not limited to allowing inflow of water to or tapping of water from the heat transfer pipes, and includes a concept of the header section (passage) being configured to allow communication between the heat transfer pipes.

In the above-mentioned embodiment, while the reverse combustion type in which the burner is disposed above the heat exchanger has been provided, there is no limitation thereto, and for example, a normal combustion type in which the burner is disposed below the heat exchanger may be provided. Heating gas is not limited to combustion gas, and for example, may be a high temperature exhaust gas or the like generated in a cogeneration system.

The heat exchanger according to the disclosure may also be used for purposes different from those of a water heating apparatus. Accordingly, the fluid to be heated may also be a fluid other than water.

The water heating apparatus according to the disclosure includes a function of heating water to generate hot water, and in addition to a general water heater, for example, may have a configuration as a bath water heater, a water heating apparatus for heating, a water heating apparatus for melting snow, or the like.

What is claimed is:

1. A heat exchanger, comprising:
a case having at least one sidewall section and into which heating gas is supplied;
a heat transfer pipe accommodated in the case and through which a fluid to be heated flows; and
first and second header sections, each of which has a protruding part provided in the sidewall section and a chamber formed using the protruding part, and the heat transfer pipe is connected to the chamber such that the fluid to be heated enters and exit the chamber,
wherein the sidewall section has a configuration in which an inner plate and an outer plate overlap each other,
the protruding part of the first header section is provided on the inner plate and protrudes toward an inside of the case,
wherein the heat transfer pipe comprising a fin-attached heat transfer pipe attached with a plurality of fins, and the plurality of fins are arranged and joined in an axis direction of the heat transfer pipe,
wherein a gap is formed between a fin of an outermost end portion, among the plurality of fins, and the sidewall section of the case, and
the protruding part of the first header section closes a lower opening section or an upper opening section of the gap.

2. The heat exchanger according to claim 1,
wherein a portion of the outer plate facing the protruding part of the first header section is a first auxiliary protruding part that protrudes toward the outside of the case, and
the chamber of the first header section is formed using the first auxiliary protruding part.

3. A water heating apparatus, comprising:
the heat exchanger according to claim 1.

* * * * *